United States Patent [19]

Yamamoto et al.

[11] Patent Number: 5,004,764

[45] Date of Patent: Apr. 2, 1991

[54] COMPOSITION FOR VIBRATION DAMPER, PROCESS FOR MANUFACTURE THEREOF, AND VIBRATION DAMPER

[75] Inventors: Yohzoh Yamamoto; Shuichi Ishiwata, both of Ichihara; Kenji Yokoyama; Kimio Hasegawa, both of Tokyo, all of Japan

[73] Assignees: Mitsui Petrochemical Industries, Ltd.; NEC Environment Engineering, Ltd., both of Tokyo, Japan

[21] Appl. No.: 308,006

[22] Filed: Feb. 9, 1989

[30] Foreign Application Priority Data

| Feb. 12, 1988 | [JP] | Japan | 63-031416 |
| Feb. 12, 1988 | [JP] | Japan | 63-031417 |
| Feb. 12, 1988 | [JP] | Japan | 63-031418 |

[51] Int. Cl.$^5$ .................... C08L 63/04; C08L 63/02
[52] U.S. Cl. ................... 523/400; 523/458; 523/466; 523/468
[58] Field of Search ............... 523/400, 466, 468

[56] References Cited

U.S. PATENT DOCUMENTS

| 4,246,162 | 1/1981 | Schreiber | 523/466 |
| 4,304,694 | 12/1981 | Scola et al. | 523/468 |
| 4,528,305 | 7/1985 | Henry | 523/468 |

*Primary Examiner*—Lewis T. Jacobs
*Attorney, Agent, or Firm*—Birch, Stewart, Kolasch & Birch

[57] ABSTRACT

A composition for a vibration damper, which comprises:

100 parts by weight of a resin-forming component comprising (a) a compound containing an epoxy group, and (b) a curing component comprising (i) a polyhydric phenol as a first curing compound and (ii) a second curing compound selected from the group consisting of an acid hydrazide, a urea derivative and an imidazole;

50 to 500 parts by weight of a scaly filler;

200 parts by weight or less of powdery filler; and 100 parts by weight or less of a fibrous filler. A process for the manufacture of the composition, and a vibration damper, also are disclosed.

11 Claims, No Drawings

COMPOSITION FOR VIBRATION DAMPER, PROCESS FOR MANUFACTURE THEREOF, AND VIBRATION DAMPER

BACKGROUND OF THE INVENTION

1. Field of the Invention

The present invention relates to a composition for a vibration damper, a process for the manufacture of the composition, and the vibration damper.

2. Description of the Related Art

To avoid a transmission of vibration from a vibration source to other portions, a method has been adopted wherein a vibration-insulating rubber or an air spring is interposed between contacting areas of the vibration source and another portion. Although the transmission of vibration can be prevented by this method, it cannot dampen the vibration per se of the vibration source.

Accordingly, a method has been adopted in which the vibration of a vibrating member is damped by bringing a vibration damper into close contact with the vibrating member. This method, in principle, utilizes the conversion heat at the glass transition point or melting point of a resin component constituting the vibration damper, whereby the vibration energy is converted to heat, and thus the vibration per se is damped.

As the material constituting the vibration damper, a polyamide resin, a polyvinyl chloride resin and an epoxy resin have been used, but a vibration damper prepared from a vibration damper-forming composition comprising a polyamide resin as the main component has poor water resistance, chemical resistance, and mechanical strength, and thus has a limited application, and a vibration damper composed mainly of the polyvinyl chloride resin is defective in that it is difficult to form a vibration damper having a complicated shape and the manufacturing cost is increased when various vibration dampers are prepared in small quantities.

In principle, a vibration damper composed mainly of epoxy resin has a good vibration-damping property, and when a vibration damper composed mainly of epoxy resin is prepared, a room temperature-curing composition is usually used.

Where a vibration damper is attached to the parts formed by mass production, such as automobile parts and electric parts, preferably a process capable of continuously attaching the vibration damper is used, such as a cast molding process, transfer molding process or press molding process.

The room temperature-curing epoxy resin composition usually used for a vibration damper is a two-liquid type composition comprising a main component and a curing agent, and when a vibration damper is formed by using the above-mentioned molding process, the main component must be pre-mixed with the curing agent, and thus the preparation process becomes complicated. Moreover, the pot life of the room temperature-curing composition for a vibration damper is generally short, after the main component is mixed with the curing agent, and therefore, all of the composition must be used in a short period of time. Accordingly, the above room temperature-curing epoxy resin composition is not suitable for a process for the continuous production of a vibration damper.

To overcome the defects of the above-mentioned two-liquid type composition for a vibration damper, a potential curing agent has been used as the curing agent, but when potential curing agents customarily used for epoxy resins are used for the production of a vibration damper, it is difficult to obtain vibration dampers having a satisfactory vibration-damping capability.

SUMMARY OF THE INVENTION

The object of the present invention is to solve the above problems of the conventional techniques and to provide a novel one-liquid type composition for a vibration damper, which composition has good stability and excellent moldability and is suitable for a continuous preparation of a vibration damper having good vibration-damping capability and long durability.

Another object of the present invention is to provide a process for the manufacture of the one-liquid composition.

Still another object of the present invention is to provide a vibration damper having excellent vibration-damping capability and long durability.

Other objects and advantages of the present invention will be apparent from the following description.

In accordance with the present invention, there is provided a composition for a vibration damper, which comprises:

100 parts by weight of a resin-forming component comprising (a) a compound containing an epoxy group, and (b) a curing component comprising (i) a polyhydric phenol as a first curing compound and (ii) a second curing compound selected from the group consisting of an acid hydrazide, a urea derivative and an imidazole;

50 to 500 parts by weight of a scaly filler;

200 parts by weight or less of a powdery filler; and 100 parts by weight or less of a fibrous filler.

Further, the present invention relates to a process for the manufacture of a composition for a vibration damper, which comprises the steps of:

mixing a compound containing an epoxy group with a polyhydric phenol as a first curing compound under heating;

cooling the mixture;

adding a second curing compound selected from the group consisting of an acid hydrazide, a urea derivative and an imidazole, a scaly filler, a powdery filler, and a fibrous filler to the cooled mixture; and mixing the total resultant mixture to thereby obtain a composition containing 50–500 parts by weight of the scaly filler, 200 parts by weight or less of the powdery filler and 100 parts by weight or less of the fibrous filler, with respect to 100 parts by weight of the resin-forming component.

Furthermore, the present invention relates to a vibration damper comprising a heat-cured body of a resin-forming component composed of (a) a compound containing an epoxy group, and (b) a curing component comprising (i) a polyhydric phenol as a first curing compound and (ii) a second curing compound selected from the group consisting of an acid hydrazide, a urea derivative and an imidazole, and dispersed in the heat-cured body, 50 to 500 parts by weight of a scaly filler, 200 parts by weight or less of a powdery filler and 100 parts by weight or less of a fibrous filler, with respect to 100 parts by weight of the heat-cured body.

Although the composition for a vibration damper according to the present invention is a one-liquid type, the composition has very high stability and very good moldability. Accordingly, the composition of the present invention is especially preferably applied to a continuous preparation process using a molding apparatus.

Furthermore, a vibration damper obtained by heat-molding the vibration damper-forming composition of the present invention has excellent characteristics such as vibration-damping capability, durability, and adhesion.

DESCRIPTION OF THE PREFERRED EMBODIMENTS

Vibration dampers are often prepared by a continuous molding process, as pointed out hereinbefore, and accordingly, vibration damper-forming compositions used for the production of vibration dampers are required to have not only a good moldability but also an excellent stability. Furthermore, to impart a good vibration-damping capacity to vibration dampers formed by using such compositions, a good balance must be maintained among characteristics such as the damping ratio, mass and dynamic elastic modulus.

To satisfy these requirements, an epoxy resin having, in essence, a good vibration-damping property is selected as the resin component constituting a vibration damper, and the reduction of the moldability and stability of the composition, caused by the use of an epoxy resin, is overcome by using a specific curing component. Furthermore, by using a plurality of specific fillers in combination with the epoxy resin, the vibration-damping capability can be improved.

The vibration damper-forming composition of the present invention contains, as the resin-forming component, an epoxy group-containing compound, and a curing component comprising a first curing compound (a polyhydric phenol) and a second curing compound selected from the group consisting an acid hydrazide, a urea derivative and an imidazole.

As the epoxy group-containing compound used in the present invention, there can be mentioned, for example, polyglycidyl ethers such as sorbitol polyglycidyl ether, pentaerythritol polyglycidyl ether, glycerol polyglycidyl ether, neopentyl glycol diglycidyl ether, ethylene glycol diglycidyl ether, polyethylene glycol diglycidyl ether, propylene glycol diglycidyl ether and polypropylene glycol diglycidyl ether; glycidyl esters such as diglycidyl phthalate, diglycidyl hexahydrophthalate and diglycidyl p-hydroxybenzoate; alicyclic epoxy resins such as alicyclic diepoxyacetal, alicyclic diepoxyadipate, alicyclic diepoxycarboxylate and vinylcyclohexene dioxide; bisphenol type epoxy resins such as a bisphenol A type epoxy resin and a bisphenol F type epoxy resin; and novolak type epoxy resins such as an o-cresol novolak type epoxy resin.

The epoxy equivalent value of the epoxy group-containing compound used in the present invention is generally 50 to 2000. If the epoxy equivalent value is too large, the mechanical strength of the obtained vibration damper may be reduced. In the present invention, if an epoxy group-containing compound having an epoxy equivalent value of 75 to 1500 g/equivalent is used, a vibration damper having an especially excellent mechanical strength and vibration-damping capability can be provided.

To adjust the viscosity of the vibration damper-forming composition and impart flexibility, a reactive diluent such as a monoepoxy compound can be used in combination with the above-mentioned epoxy group-containing compound.

A compound having one benzene ring and at least two hydroxyl groups bonded directly to the benzene ring is appropriately selected and used as the first curing compound, i.e., the polyhydric phenol. As the polyhydric phenol, there can be mentioned, for example, bisphenols such as bisphenol A and bisphenol F; hydroxybenzene derivatives such as hydroquinone, pyrogallol and phloroglucinol; compounds having a glycidoxyphenyl group, such as 1,1,3-tris(2-methyl-4-glycidoxy-5-t-butylphenyl)-butane and 1-[α-methyl-α-(4'-glycidoxyphenyl)ethyl]-4-[α'-α'-bis (4''-glycidoxyphenyl)ethyl]-benzene and novolak resins having, in general, a softening point of 80° to 120° C., such as a phenylnovolak resin, a cresol novolak resin and an octylphenyl novolak resin.

These polyhydric phenols can be used singly or as a mixture of two or more thereof.

Bisphenols and novolak resins are especially preferably used as the polyhydric phenol in the present invention.

The amount of the polyhydric phenol incorporated in the vibration damper-forming composition of the present invention is usually adjusted so that the amount of the hydroxyl group of the polyhydric phenol is 0.6 to 1.3 equivalents per equivalent of the epoxy group of the epoxy group-containing compound. If the amount of the polyhydric phenol is outside the above-mentioned range, a three-dimensional structure may not be formed in the resin constituting the vibration damper and the mechanical strength of the vibration damper will be degraded. In the present invention, if the amount of the polyhydric phenol is adjusted so that the amount of the hydroxyl group is 0.8 to 1.1 equivalents per equivalent of the epoxy group, a vibration damper having an especially excellent vibration-damping capability and mechanical strength can be prepared.

As the acid hydrazide that can be used in the present invention, there can be mentioned, for example, succinic acid dihydrazide, adipic acid dihydrazide, sebacic acid dihydrazide, caprylic acid dihydrazide, stearic acid hydrazide, isophthalic acid dihydrazide, p-hydroxybenzoic acid dihydrazide, salicylic acid hydrazide and phenylaminopropionic acid hydrazide. These acid hydrazides can be used singly or as a mixture of two or more thereof. In the present invention, dihydrazides derived from a carboxylic acid having two carboxyl groups and hydrazine, such as succinic acid dihydrazide, adipic acid dihydrazide, sebacic acid dihydrazide, caprylic acid dihydrazide and isophthalic acid dihydrazide, are preferably used, and an acid dihydrazide having an alkylene group having 1 to 6 carbon atoms, such as adipic acid dihydrazide, sebacic acid dihydrazide or caprylic acid dihydrazide, is especially preferred.

In the vibration damper-forming composition of the present invention, the acid hydrazide is incorporated in an amount of 0.001 to 0.3 mole, preferably 0.005 to 0.1 mole, per gram-equivalent of the epoxy group-containing compound. If the acid hydrazide is used in an amount within this range, the acid hydrazide acts effectively as a curing promoter and curing agent and the characteristics of the obtained vibration damper are improved.

In view of the curability of the vibration damper-forming composition and the vibration-damping capability of the obtained vibration damper, preferably the mixing ratio of the polyhydric phenol to the acid hydrazide in the vibration damper-forming composition of the present invention is such that the amount of the acid hydrazide is 0.001 to 0.3 mole, especially 0.005 to 0.1 mole, per gram-equivalent of the OH group of the polyhydric phenol.

As the urea derivative, preferably a compound is used of the formula

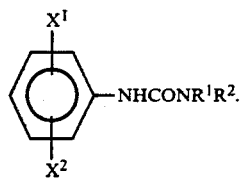

$$\text{(I)}$$

In the above-mentioned formula (I), $R^1$ and $R^2$ independently stand for a lower alkyl group. In the present invention, $R^1$ and $R^2$ are preferably the same lower alkyl groups having the same number of carbon atoms. A lower alkyl group having 1 to 6 carbon atoms is preferred as the lower alkyl group, and a methyl group or an ethyl group is especially preferred.

In the above-mentioned formula (I), $X^1$ and $X^2$ stand for a hydrogen atom, a halogen atom, a lower alkyl group, an alkoxyl group and a nitro group, and $X^1$ and $X^2$ may be the same or different.

Although the present invention is not limited to a particular concept, it is understood that the compound of the formula (I) is decomposed to form a dialkylamine at the heat-curing step and acts as a curing agent or curing promoter. In connection with the vibration-damping capacity and strength of the obtained vibration damper, the atoms and groups designated by $X^1$ and $X^2$ in the formula (I) exert substantially equivalent actions, but where $X^1$ and $X^2$ stand for a halogen atom or a hydrogen atom, the dialkyl-amine-forming speed is increased. Especially, where the halogen atom is a chlorine atom, this tendency is remarkable, and the stability of the compound is improved under normal conditions.

As examples of the compound of the formula (I) that can be used in view of the reactivity depending on the substituent or the like, there can be mentioned, 3-phenyl-1,1-dimethylurea, 3-(p-chlorophenyl)-1,1-dimethylurea, 3-(3,4-dichlorophenyl)-1,1-dimethylurea, 3-(o-methylphenyl)-1,1-dimethylurea, 3-(p-methylphenyl)-1,1-dimethylurea, 3-(methoxyphenyl)-1,1-dimethylurea, 3-(nitrophenyl)-1,1-dimethylurea, 3-(p-chlorophenyl)-1,1-diphenylurea and 3-phenyl-1,1-diethylurea. These compounds can be used singly or as mixtures of two or more thereof. Of the foregoing compounds, 3-(p-chlorophenyl)-1,1-dimethylurea is especially preferred.

In the vibration damper-forming composition of the present invention, the compound of the formula (I) is incorporated in an amount of 0.001 to 0.3 mole, preferably 0.005 to 0.1 mole, per gram-equivalent of the epoxy group-containing compound. If the compound of the formula (I) is used in an amount within this range, the compound of the formula (I) acts effectively as a curing promoter and curing agent and the characteristics of the obtained vibration damper are improved.

In view of the curability of the vibration damper-forming composition and the vibration-damping capability of the obtained vibration damper, preferably the mixing ratio of the polyhydric phenol to the compound of the formula (I) in the vibration damper-forming composition of the present invention is such that the amount of the compound of the formula (I) is 0.001 to 0.3 mole, especially 0.005 to 0.1 mole, per gram-equivalent of the OH group of the polyhydric phenol.

As the imidazole that can be used in the present invention, there can be mentioned unsubstituted imidazole, substituted imidazoles having a substituent such as an alkyl group, an aryl group, an amino group, a hydroxyalkyl group or a cyanoalkyl group, and derivatives thereof. As specific examples of the imidazole that can be used in the present invention, there can be mentioned imidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 1-cyanoethyl-2-undecylimidazole, 1-cyano-ethyl-2-undecylimidazolium trimetate, 1-cyanoethyl-2-phenylimidazolium trimetate, 2-methylimidazolium isocyanurate, 2-phenylimidazolium isocyanate, 2,4-diamino-6-[2-methylimidazolyl-(1)]-ethyl-S-triazine, 2,4-diamino-6-[2-ethyl-4-methylimidazolyl-(1)]-ethyl-S-triazine, 2,4-diamino-5-[2-undecylimidazolyl-(1)]-ethyl-S-triazine, 2-phenyl-4,5-dihydroxymethylimidazole, 2-phenyl-4-methyl-5-dihydroxymethylimidazole, 1-cyanoethyl-2-phenyl-4,5-di(cyanoethoxymethyl)imidazole, 1-dodecyl-2-methyl-3-imidazolium chloride and 1,3-dibenzyl-2-methylimidazolium chloride. These imidazoles can be used singly or as a mixture of two or more thereof.

In the present invention, preferably an imidazole having an alkyl group with 1 to 5 carbon atoms as a substituent at the 2-position of the imidazole ring is used.

In the vibration damper-forming composition of the present invention, the imidazole is incorporated in an amount of 0.001 to 0.3 mole, preferably 0.005 to 0.1 mole, per gram-equivalent of the epoxy group-containing compound. If the imidazole is used in an amount within this range, the imidazole acts effectively as a curing promoter and curing agent and the characteristics of the obtained vibration damper are improved.

In view of the curability of the vibration damper-forming composition and the vibration-damping capability of the obtained vibration damper, preferably the mixing ratio of the polyhydric phenol to the imidazole in the vibration damper-forming composition of the present invention is such that the amount of the imidazole is 0.001 to 0.3 mole, especially 0.005 to 0.1 mole, per gram-equivalent of the OH group of the polyhydric phenol.

The vibration damper-forming composition of the present invention comprises specific amounts of fillers having a specific shape in addition to the above-mentioned resin-forming component. The fillers used in the present invention are a scaly filler, a powdery filler, and a fibrous filler.

Of these fillers, the scaly filler exerts mainly a function of improving the vibration-damping capability and elastic modulus of the vibration damper.

As examples of the scaly filler to be used in the present invention, there can be mentioned mica, laminated mica, scaly graphite, alumina flake, glass flake, silicon carbide flake, steel flake and scaly iron oxide. These scaly fillers can be used singly or as a mixture of two or more thereof. As the scaly filler, any filler having the shape of scaly (or flaky) can be used in the present invention, but a scaly filler having an aspect ratio of at least 5 (especially 20 to 100) is preferable.

The amount of the scaly filler incorporated in the vibration damper-forming composition is 50 to 500 parts by weight per 100 parts by weight of the resin-forming component in the composition. If the amount of the scaly filler exceeds 500 parts by weight, the flowability of the composition is degraded and the moldability is reduced. If the amount of the scaly filler is smaller than 50 parts by weight, the effect by incorporation of the scaly filler is not substantially observed. In the present invention, if the scaly filler is used in an amount of 100 to 400 parts by weight, a vibration damper having an excellent vibration-damping capability and durability can be easily obtained.

The powdery filler contained in the vibration damper-forming composition exerts the functions of compensating a reduction of the flowability of the composition, caused by incorporation of the above-mentioned scaly filler, improving the mechanical strength of the obtained vibration damper, and adjusting the density of the obtained vibration damper.

As examples of the powdery filler to be used in the invention, there can be mentioned ferrite, calcium carbonate, silica, talc, aluminum hydroxide and alumina powder. In view of the dispersibility in the composition, preferably a powdery filler having an average particle size of at least 0.1 μm is used. If a powdery filler having an average particle size of 0.2 to 5.0 μm is used, the flowability and moldability of the composition are greatly improved, and a vibration damper having a high mechanical strength and a good density can be easily prepared.

The amount of the powdery filler incorporated in the vibration damper-forming composition is up to 200 parts by weight per 100 parts by weight of the resin-forming component. If the amount of the powdery filler exceeds 200 parts by weight, the flowability of the composition is degraded. If the amount of the powdery filler incorporated is adjusted to 1 to 100 parts by weight, the moldability of the vibration damper-forming component is improved and a vibration damper having a high mechanical strength can be easily obtained.

The fibrous filler incorporated in the vibration damper-forming composition of the present invention exerts the functions of effectively preventing a sedimentation of the scaly filler and powdery filler in the composition, improving the mechanical strength of the obtained vibration damper and preventing a lowering of the vibration-damping capability, which in turn brings an improvement of the vibration-damping capability.

As examples of the fibrous filler that can be used in the present invention, there can be mentioned inorganic fibrous fillers such as asbestos, rock wool, a fibrous magnesium compound, an alumina fiber, a calcium titanate fiber and a carbon fiber, and organic fibrous fillers such as an artificial pulp of a polyolefin, a polyamide resin, a polyester resin, an acrylic resin, a polyvinyl alcohol resin and a wood pulp. In these fibrous fillers, the aspect ratio is usually from 10 to 1000. Among these fibrous fillers, an artificial pulp of polyethylene or polypropylene, a fibrous magnesium compound, and asbestos are especially preferred.

The amount of the fibrous filler incorporated in the vibration damper-forming composition of the present invention is up to 100 parts by weight per 100 parts by weight of the resin-forming component. If the amount of the fibrous filler exceeds 100 parts by weight, the flowability of the composition is degraded.

In the present invention, preferably the fibrous filler is used in an amount of 1 to 50 parts by weight.

Additives such as a plasticizer, an internal release agent, a coupling agent, a defoaming agent, and a levelling agent can be incorporated in the vibration damper-forming composition of the present invention.

As the plasticizer, there can be mentioned, for example, an aromatic alcohol, an alkylphenol, a lactone, a furfuryl alcohol, phthalic acid ester, a polyglycol, asphalt, coal tar, cationic polymer of an aromatic compound and a polymer of an aromatic compound with formaldehyde. Usually, the plasticizer is used in an amount of up to 500 parts by weight per 100 parts by weight of the resin-forming component. If the amount of the plasticizer incorporated exceeds 500 parts by weight, the strength of the vibration damper is often degraded.

If the above-mentioned plasticizer is used, the glass transition point or melting point can be adjusted to the temperature at which the vibration damper is used, and the vibration-damping capability possessed by the obtained vibration damper can be effectively utilized.

Stearic acid can be mentioned as the release agent to be used in the present invention, and as the coupling agent, there can be mentioned a silane type compound and a titanium type compound. Customarily used defoaming agents and levelling agents can be used in the present invention.

The vibration damper-forming composition of the present invention can be prepared by mixing the above-mentioned ingredients. Preferably a method is used wherein the epoxy group-containing compound, the polyhydric phenol, and optionally, the plasticizer, are pre-mixed under heating (usually at 50° to 200° C.) and then the second curing compound, the scaly filler, the powdery filler, the fibrous filler, and other additives are added and mixed at a temperature close to room temperature. This is because, if the second curing compound is added under heating together with the polyhydric phenol, the curing reaction is advanced during the mixing.

A vibration damper can be prepared by heating and curing the resulting vibration damper-forming composition. The vibration damper-forming composition of the present invention is especially preferably used for the continuous production by the cast molding method, the transfer molding method, and the press molding method.

For example, if the vibration damper is prepared by the above-mentioned molding method, the conditions are set at the heat-curing temperature and heat-curing time of the vibration damper-forming composition used, and if desired, the molding is carried out under compression.

The resulting vibration damper comprises a heat-cured body of the resin-forming component comprising the epoxy group-containing compound, the first curing compound (polyhydric phenol) and the second curing compound (acid hydrazide, urea derivative or imidazole), and the scaly filler, powdery filler, and fibrous filler dispersed in the heat-cured body. The contents of these fillers in the vibration damper per 100 parts by weight of the heat-cured body of the resin-forming component are such that the amount of the scaly filler is 50 to 500 parts by weight (preferably 100 to 400 parts by weight), the amount of the powdery filler is up to 200 parts by weight (preferably 1 to 100 parts by weight) and the amount of the fibrous filler is up to 100 parts by weight (preferably 1 to 50 parts by weight).

The heat-cured body has a structure derived from the epoxy group-containing compound, the polyhydric phenol in an amount such that the amount of the hydroxyl group is 0.6 to 1.3 equivalents per equivalent of the epoxy group of the epoxy group-containing compound, and the second curing compound in an amount of 1 to 10 parts by weight per 100 parts by weight of the epoxy group-containing compound.

Since the vibration damper-forming composition of the present invention is a one-liquid type composition improved highly in stability, the composition of the present invention is especially suitable for production by the above-mentioned molding methods, but the molding methods are not limited to those mentioned above. For example, the composition of the present invention can be applied to a method in which the composition is directly filled in a space of a vibration source of a metal or concrete, and then is heated and cured.

Although the vibration damper-forming composition according to the present invention is a one-liquid type composition, a very high stability is given to the composition of the present invention, and a good moldability is obtained, by combining a compound containing an epoxy group with a specific curing component. Moreover, a reduction of the vibration-damping capability and mechanical strength by the use of the specific curing component can be effectively prevented by incorporating three kinds of fillers having different shapes. Accordingly, the vibration damper-forming composition of the present invention can be effectively used for a process in which a vibration damper is continuously prepared. Furthermore, since the vibration damper-forming composition of the present invention is of the one-liquid type, the step of calculating the amount to be used for the molding and forming the composition precisely in the corresponding amount in advance becomes unnecessary, and thus the process for preparing a vibration damper is simplified.

In a vibration damper obtained by heat-curing the vibration damper-forming composition of the present invention, the epoxy group-containing compound is used, and further, the specific curing component and specific fillers are used in combination therewith to form the epoxy resin heat-cured body, and therefore, the respective ingredients interact with each other, whereby the vibration-damping capability, mechanical strength, adhesiveness, and other characteristics are improved.

The present invention will now be described in detail with reference to the following examples, that by no means limit the scope of the invention.

EXAMPLE 1

A planetary mixer was charged with 100 parts by weight of a bisphenol A type epoxy resin having an epoxy equivalent value of 188 g/equivalent, 57 parts by weight of a bisphenol novolak resin having a softening point of 97° C. (as determined by the UCC method) and 350 parts by weight of a phenol-modified aromatic polymer oil as the plasticizer, and the whole was mixed at 100° C. for 1 hour to form a homogeneous resin solution.

The resin solution was cooled to room temperature, and then 3 parts by weight of adipic acid dihydrazide, 300 parts by weight of mica (having an aspect ratio of 70) as the scaly filler, 10 parts by weight of ferrite (having an average particle size of 1 μm) as the powdery filler and 1 part by weight of a fibrous magnesium compound (having an average aspect ratio of about 50) as the fibrous filler were added to the resin solution. The mixture was kneaded at room temperature for 30 minutes to produce a vibration damping-forming composition according to the present invention.

A dewaxed and sandblasted steel plate having a thickness of 5 mm, a width 30 mm and a length of 300 mm was charged into mold, the above-mentioned vibration damper-forming composition was coated on the steel plate, in a thickness of 5 mm, a width of 30 mm, and a length of 300 mm, and press molding was carried out to prepare a vibration damper of the present invention. At the molding step, the curing temperature was 130° C. and the heat-curing time was 1 hour.

The adhesiveness of the obtained vibration damper-forming composition to the steel plate, the moldability and storage stability of the composition, and the adhesiveness of the vibration damper were measured.

The measurement methods used were as follows.

Vibration-Damping Capability

The vibration damping ratio of the bending primary mode (about 300 Hz) was determined at various temperatures according to the two-point hanging resonance method.

For the vibration-damping capability of the vibration damper of the present invention, the maximum vibration damping ratio [(C/Cc)max] obtained at the above-mentioned test, and the temperature (Tmax) at which the maximum vibration damping ratio was obtained are shown in Table 1.

Moldability

When a flaw caused by an insufficient flowability of the composition or a crack due to curing shrinkage were not observed in the obtained vibration damper, the sample is designated in Table 1 as "eligible".

Adhesiveness

After the measurement of the vibration-damping capability test, a bonding force-measuring tool (having a cylindrical shape and a diameter of 20 mm) was bonded to the surface of the vibration damper by an epoxy type adhesive. Then, the vibration damper outside the tool was cut from the steel plate by a core drill.

The tool was then pulled vertically to the surface of the vibration damper by a tensile tester, to determine the bonding strength.

The results are shown in Table 1.

The symbols used in Table 1 have the following meanings.

A: bonding force of 30 kgf/cm$^2$ or more
B: bonding force from 20 kgf/cm$^2$ to less than 30 kgf/cm$^2$
C: bonding force lower than 20 kgf/cm$^2$

Storage Stability

For the vibration damper-forming composition shortly after the preparation and the vibration damper-forming composition after storage at 15° C. for 3 months, the curing speed was measured by using a JSR type curastometer (Imanaka Kikai Kogyo).

When the maximum torque value of the composition stored was at least ½ that of the composition shortly after preparation, the storage stability test sample is designated in Table 1 as "eligible".

In Examples 2 to 15 given hereinafter, the vibration damping capability, moldability, adhesiveness, and storage stability were determined by the above-mentioned methods.

EXAMPLE 2

A vibration damper-forming composition was prepared in the same manner as described in Example 1, except that a bisphenol A type epoxy resin having an epoxy equivalent value of 475 g/equivalent was used instead of the bisphenol A type epoxy resin used in Example 1, the amount of the phenyl novolak resin was changed to 23 parts by weight and the amount of the phenol-modified aromatic polymer oil was changed to 170 parts by weight. A vibration damper was prepared in the same manner as described in Example 1 by using the resulting composition.

The adhesiveness of the obtained vibration damper-forming composition to the steel plate, the moldability and storage stability of the composition, and the adhesiveness of the vibration damper were determined. The results are shown in Table 1.

EXAMPLE 3

A vibration damper-forming composition was prepared in the same manner as described in Example 2, except that the amount of the phenol-modified aromatic polymer oil used was changed to 33 parts by weight. A vibration damper was prepared in the same manner as described in Example 1 by using the resulting vibration damper-forming composition.

The adhesiveness of the obtained vibration damper-forming composition to the steel plate, the moldability and storage stability of the composition, and the adhesiveness of the vibration damper were determined. The results are shown in Table 1.

EXAMPLE 4

A vibration damper-forming composition was prepared in the same manner as described in Example 1, except that an o-cresol novolak epoxy resin (epoxy equivalent value=225) was used instead of the bisphenol A type epoxy resin used in Example 1, 50 parts by weight of bisphenol A was used instead of the phenyl novolak resin and the amount the phenol-modified aromatic polymer oil used was changed to 44 parts. A vibration damper was prepared in the same manner as described in Example 1 by using the resulting vibration damper-forming composition.

The adhesiveness of the vibration damper-forming composition to the steel plate, the moldability and storage stability of the composition, and the adhesiveness of the vibration damper were determined. The results are shown in Table 1.

EXAMPLE 5

A vibration damper-forming composition was prepared in the same manner as described in Example 1, except that a polypropylene glycol diglycidyl ether (having an epoxy equivalent value of 172 g/equivalent) was used instead of the bisphenol A type epoxy resin used in Example 1 and the phenol-modified aromatic polymer oil was not used.

A vibration damper was prepared in the same manner as described in Example 1 by using the resulting composition.

The adhesiveness of the obtained vibration damper-forming composition to the steel plate, the moldability and storage stability of the composition, and the adhesiveness of the vibration damper were determined. The results are shown in Table 1.

EXAMPLE 6

A planetary mixer was charged with 100 parts by weight of a bisphenol A type epoxy resin having an epoxy equivalent value of 188 g/equivalent, 57 parts by weight of a bisphenol novolak resin having a softening point of 97° C. (as determined by the UCC method) and 350 parts by weight of a phenol-modified aromatic polymer oil as the plasticizer, and the whole was mixed at 100° C. for 1 hour to form a homogeneous resin solution.

The resin solution was cooled to room temperature, and 5 parts by weight of 3-(p-chlorophenyl)-1, 1-dimethylurea, 300 parts by weight of mica (having an aspect ratio of 70) as the scaly filler, 10 parts by weight of ferrite (having an average particle size of 1 μm) as the powdery filler and 1 part by weight of a fibrous magnesium compound (having an average aspect ratio of about 50) as the fibrous filler were added to the resin solution. The mixture was kneaded at room temperature for 30 minutes to produce a vibration damper-forming composition according to the present invention.

A dewaxed and sandblasted steel plate having a thickness of 5 mm, a width of 30 mm and a length of 300 mm was charged into a mold, the above-mentioned vibration damper-forming composition was coated on the steel plate, to a thickness of 5 mm, a width of 30 mm and a length of 300 mm, and press molding was carried out to prepare a vibration damper of the present invention. At the molding step, the curing temperature was 130° C. and the heat-curing time was 1 hour.

The adhesiveness of the obtained vibration damper-forming composition to the steel plate, the moldability and storage stability of the composition and the adhesiveness of the vibration damper were measured. The results are shown in Table 1.

EXAMPLE 7

A vibration damper-forming composition was prepared in the same manner as described in Example 6, except that a bisphenol A type epoxy resin having an epoxy equivalent value of 475 g/equivalent was used instead of the bisphenol A type epoxy resin used in Example 6, the amount of the phenyl novolak resin used was changed to 23 parts by weight and the amount of the phenol-modified aromatic polymer oil used was changed to 170 parts by weight. A vibration damper was prepared in the same manner as described in Example 6 by using the resulting composition.

The adhesiveness of the obtained vibration damper-forming composition to the steel plate, the moldability and storage stability of the composition, and the adhesiveness of the vibration damper were determined. The results are shown in Table 1.

EXAMPLE 8

A vibration damper-forming composition was prepared in the same manner as described in Example 7, except that the amount of the phenol-modified aromatic polymer oil used was changed to 33 parts by weight. A vibration damper was prepared in the same manner as described in Example 6 by using the resulting vibration damper-forming composition.

The adhesiveness of the obtained vibration damper-forming composition to the steel plate, the moldability and storage stability of the composition, and the adhesiveness of the vibration damper were determined. The results are shown in Table 1.

EXAMPLE 9

A vibration damper-forming composition was prepared in the same manner as described in Example 6, except that an o-cresol novolak epoxy resin (epoxy equivalent value=225) was used instead of the bisphenol A type epoxy resin used in Example 6, 50 parts by weight of bisphenol A was used instead of the phenyl novolak resin and the amount the phenol-modified aromatic polymer oil used was changed to 44 parts. A vibration damper was prepared in the same manner as described in Example 6 by using the resulting vibration damper-forming composition.

The adhesiveness of the vibration damper-forming composition to the steel plate, the moldability and storage stability of the composition, and the adhesiveness of the vibration damper were determined. The results are shown in Table 1.

EXAMPLE 10

A vibration damper-forming composition was prepared in the same manner as described in Example 6, except that a polypropylene glycol diglycidyl ether (having an epoxy equivalent value of 172 g/equivalent) was used instead of the bisphenol A type epoxy resin used in Example 6 and the phenol-modified aromatic polymer oil was not used. A vibration damper was prepared in the same manner as described in Example 6 by using the resulting composition.

The adhesiveness of the obtained vibration damper-forming composition to the steel plate, the moldability and storage stability of the composition, and the adhesiveness of the vibration damper were determined. The results are shown in Table 1.

EXAMPLE 11

A planetary mixer was charged with 100 parts by weight of bisphenol A type epoxy resin having an epoxy equivalent value of 188 g/equivalent, 57 parts by weight of bisphenol novolak resin having a softening point of 97° C. (as determined by the UCC method) and 350 parts by weight of a phenol-modified aromatic polymer oil as the plasticizer, and the whole was mixed at 100° C. for 1 hours to form a homogeneous resin solution.

The resin solution was cooled to room temperature, and 1.5 parts by weight of 2-methylimidazole, 300 parts by weight of mica (having an aspect ratio of 70) as the scaly filler, 10 parts by weight of ferrite (having an average particle size of 1 μm) as the powdery filler and 1 part by weight of fibrous magnesium compound (having an average aspect ratio of about 50) as the fibrous filler were added to the resin solution. The mixture was kneaded at room temperature for 30 minutes to produce a vibration damper-forming composition according to the present invention.

A dewaxed and sandblasted steel plate having a thickness of 5 mm, a width of 30 mm and a length of 300 mm was charged into a mold, the above-mentioned vibration damper-forming composition was coated on the steel plate to a thickness of 5 mm, a width of 30 mm and a length of 300 mm, and press molding was carried out to prepare a vibration damper of the present invention. At the molding step, the curing temperature was 130° C. and the heat-curing time was 1 hour.

The adhesiveness of the obtained vibration damper-forming composition to the steel plate, the moldability and storage stability of the composition, and the adhesiveness of the vibration damper were measured. The results are shown in Table 1.

EXAMPLE 12

A vibration damper-forming composition was prepared in the same manner as described in Example 11, except that a bisphenol A type epoxy resin having an epoxy equivalent value of 475 g/equivalent was used instead of the bisphenol A type epoxy resin used in Example 11, the amount of the phenyl novolak resin used was changed to 23 parts by weight and the amount of the phenol-modified aromatic polymer oil used was changed to 170 parts by weight. A vibration damper was prepared in the same manner as described in Example 11 by using the resulting composition.

The adhesiveness of the obtained vibration damper-forming composition to the steel plate, the moldability and storage stability of the composition, and the adhesiveness of the vibration damper were determined. The results are shown in Table 1.

EXAMPLE 13

A vibration damper-forming composition was prepared in the same manner as described in Example 12, except that the amount of the phenol-modified aromatic polymer oil used was changed to 33 parts by weight. A vibration damper was prepared in the same manner as described in Example 11 by using the resulting vibration damper-forming composition.

The adhesiveness of the obtained vibration damper-forming composition to the steel plate, the moldability and storage stability of the composition, and the adhesiveness of the vibration damper were determined. The results are shown in Table 1.

EXAMPLE 14

A vibration damper-forming composition was prepared in the same manner as described in Example 11, except that an o-cresol novolak epoxy resin (epoxy equivalent value=225) was used instead of the bisphenol A type epoxy resin used in Example 11, 50 parts by weight of bisphenol A was used instead of the phenyl novolak resin and the amount the phenol-modified aromatic polymer oil used was changed to 44 parts. A vibration damper was prepared in the same manner as described in Example 11 by using the resulting vibration damper-forming composition.

The adhesiveness of the vibration damper-forming composition to the steel plate, the moldability and storage stability of the composition, and the adhesiveness of the vibration damper were determined. The results are shown in Table 1.

EXAMPLE 15

A vibration damper-forming composition was prepared in the same manner as described in Example 11, except that a polypropylene glycol diglycidyl ether (having an epoxy equivalent value of 172 g/equivalent) was used instead of the bisphenol A type epoxy resin used in Example 11 and the phenol-modified aromatic polymer oil was not used. A vibration damper was prepared in the same manner as described in Example 11 by using the resulting composition.

The adhesiveness of the obtained vibration damper-forming composition to the steel plate, the moldability and storage stability of the composition, and the adhesiveness of the vibration damper were determined. The results are shown in Table 1.

TABLE 1

| Example No. | Vibration-Damping Capability (C/Cc) max (%) | Tmax (°C.) | Moldability | Adhesion | Storage Stability |
|---|---|---|---|---|---|
| 1 | 5.7 | 30 | eligible | A | eligible |

TABLE 1-continued

| Example No. | Vibration-Damping Capability (C/Cc) max (%) | Tmax (°C.) | Moldability | Adhesion | Storage Stability |
|---|---|---|---|---|---|
| 2 | 6.2 | 20 | eligible | A | eligible |
| 3 | 5.1 | 60 | eligible | A | eligible |
| 4 | 6.2 | 30 | eligible | A | eligible |
| 5 | 5.8 | 30 | eligible | A | eligible |
| 6 | 5.8 | 35 | eligible | A | eligible |
| 7 | 6.3 | 25 | eligible | A | eligible |
| 8 | 4.5 | 65 | eligible | A | eligible |
| 9 | 6.1 | 30 | eligible | A | eligible |
| 10 | 5.4 | 35 | eligible | A | eligible |
| 11 | 6.2 | 40 | eligible | A | eligible |
| 12 | 6.1 | 25 | eligible | A | eligible |
| 13 | 5.8 | 70 | eligible | A | eligible |
| 14 | 5.8 | 30 | eligible | A | eligible |
| 15 | 6.0 | 35 | eligible | A | eligible |

Although the present invention has been described with reference to specific embodiments, various changes and modifications obvious to those skilled in the art are deemed to be within the spirit, scope and concept of the invention.

We claim:

1. A composition for a vibration damper, which comprises:
   100 parts by weight of a resin-forming component comprising (a) a compound containing an epoxy group and having an epoxy equivalent value of 50 to 2000,
   and (b) a curing component comprising (i) a polyhydric phenol as a first curing compound and (ii) a second curing compound selected from the group consisting of an acid hydrazide and a urea derivative;
   50 to 500 parts by weight of a scaly filler;
   200 parts by weight or less of a powdery filler; and
   100 parts by weight or less of a fibrous filler, wherein the amount of the hydroxyl group of the polyhydric phenol is 0.6 to 1.3 equivalents per equivalent of the epoxy group of the epoxy group-containing compound, and the amuont of the second curing compound incorporated is 1 to 10 parts by weight per 100 parts by weight of the epoxy group-containing compound.

2. The composition for a vibration damper according to claim 1, wherein the acid hydrazide is selected from the group consisting of a monohydrazide of a monocarboxylic acid and a dihydrazide of a dicarboxylic acid.

3. The composition for a vibration damper according to claim 1, wherein the urea derivative has the formula

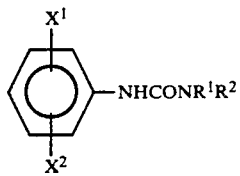

wherein $R^1$ and $R^2$ are each a lower alkyl group, and $X^1$ and $X^2$ are each a hydrogen atom, a halogen atom, a lower alkyl group, an alkoxyl group, an aryl group or a nitro group.

4. A process for the manufacture of a composition for a vibration damper, which comprises the steps of:
   mixing a resin-forming component comprising (a) a compound containing an epoxy group and having an epoxy equivalent value of 50 to 2000 with (i) a polyhydric phenol as a first curing compound of a curing component (b) under heating;
   cooling the mixture;
   adding (ii) a second curing compound of curing component (b) selected from the group consisting of an acid hydrazide and a urea derivative, a scaly filler, a powdery filler, and a fibrous filler to the cooled mixture; and
   mixing the total resultant mixture to thereby obtain a composition containing 50-500 parts by weight of the scaly filler, 200 parts by weight or less of the powdery filler and 100 parts by weight or less of the fibrous filler, with respect to 100 parts by weight of the resin-forming component comprising (a) the compound containing an epoxy group and (b) a curing component comprising (i) the first curing compound and (ii) the second curing compound, wherein the amount of the hydroxyl group of the polyhydric phenol is 0.6 to 1.3 equivalents per equivalent of the epoxy group of the epoxy group-containing compound, and the amount of the second curing compound incorporated is 1 to 10 parts by weight per 100 parts by weight of the epoxy group-containing compound.

5. A vibration damper comprising a heat-cured body of a resin-forming component comprising (a) a compound containing an epoxy group and having an epoxy equivalent value of 50 to 2000, and (b) a curing component comprising (i) a polyhydric phenol as a first curing compound and (ii) a second curing compound selected from the group consisting of an acid hydrazide and a urea derivative, and dispersed in the heat-cured body, 50 to 500 parts by weight of a scaly filler, 200 parts by weight or less of a powdery filler and 100 parts by weight or less of a fibrous filler, with respect to 100 parts by weight of the heat-cured body, wherein, the amount of the hydroxyl group of the polyhydric phenol is 0.6 to 1.3 equivalents per equivalent of the epoxy group of the epoxy group-containing compound, and the amount of the second curing compound incorporated is 1 to 10 parts by weight per 100 parts by weight of the epoxy group-containing compound.

6. The composition for a vibration damper according to claim 1, wherein the compound containing the epoxy group is a polyglycidyl ether, a glycidyl ester, an alicyclic epoxy resin, a bisphenol epoxy resin or novolak epoxy resin.

7. The process for the manufacture of a composition for a vibration damper according to claim 4, wherein the compound containing the epoxy group is a polyglycidyl ether, a glycidyl ester, an alicyclic epoxy resin, a bisphenol epoxy resin or novolak epoxy resin.

8. The vibration damper according to claim 5, wherein the compound containing the epoxy group is a polyglycidyl ether, a glycidyl ester, an alicyclic epoxy resin, a bisphenol epoxy resin or novolak epoxy resin.

9. The composition for a vibration damper according to claim 1, wherein the polyhydric phenol first curing compound is a bisphenol, a hydroxybenzene derivative, a compound having a glycidoxyphenol group and a novolak resin having a softening point of 80° to 120° C.

10. The process for the manufacture of a composition for a vibration damper according to claim 4, wherein the polyhydric phenol first curing compound is a bisphenol, a hydroxybenzene derivative, a compound having a glycidoxyphenol group and a novolak resin having a softening point of 80° to 120° C.

11. The vibration damper according to claim 5, wherein the polyhydric phenol first curing compound is a bisphenol, a hydroxybenzene derivative, a compound having a glycidoxyphenol group and a novolak resin having a softening point of 80° to 120° C.

* * * * *